(12) United States Patent
Kim

(10) Patent No.: US 10,494,752 B2
(45) Date of Patent: Dec. 3, 2019

(54) CONTROL METHOD OF WASHING MACHINE

(71) Applicant: LG ELECTRONICS INC., Seoul (KR)

(72) Inventor: Kyounglan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

(21) Appl. No.: 15/608,035

(22) Filed: May 30, 2017

(65) Prior Publication Data

US 2017/0342639 A1 Nov. 30, 2017

(30) Foreign Application Priority Data

May 30, 2016 (KR) ........................ 10-2016-0066791

(51) Int. Cl.
| | |
|---|---|
| *D06F 39/08* | (2006.01) |
| *D06F 39/00* | (2006.01) |
| *F23N 3/08* | (2006.01) |
| *G01M 3/32* | (2006.01) |
| *H02K 29/06* | (2006.01) |
| *H02P 6/16* | (2016.01) |
| *D06F 33/02* | (2006.01) |
| *D06F 35/00* | (2006.01) |

(52) U.S. Cl.
CPC ............ *D06F 39/087* (2013.01); *D06F 33/02* (2013.01); *D06F 39/002* (2013.01); *F23N 3/082* (2013.01); *G01M 3/3245* (2013.01); *H02K 29/06* (2013.01); *H02P 6/16* (2013.01); *D06F 35/006* (2013.01); *D06F 39/004* (2013.01); *D06F 2202/02* (2013.01); *D06F 2202/08* (2013.01); *D06F 2202/10* (2013.01); *D06F 2204/02* (2013.01)

(58) Field of Classification Search
CPC ..................................................... D06F 39/087
See application file for complete search history.

(56) References Cited

U.S. PATENT DOCUMENTS

2016/0312396 A1* 10/2016 Cruickshank ......... D06F 39/005

FOREIGN PATENT DOCUMENTS

| | | |
|---|---|---|
| CN | 102720033 | 10/2012 |
| CN | 105088651 | 11/2015 |
| CN | 205258875 | 5/2016 |
| DE | 197 28 106 | 1/1999 |
| EP | 1 978 141 | 10/2008 |
| EP | 2 642 013 | 9/2013 |

(Continued)

OTHER PUBLICATIONS

European Search Report dated Aug. 8, 2017 issued in Application No. 17173266.2.

(Continued)

*Primary Examiner* — Jason Y Ko
(74) *Attorney, Agent, or Firm* — KED & Associates LLP

(57) ABSTRACT

In a control method of a washing machine, a primary nephelometric turbidity unit (NTU) of washing water is sensed before a washing course is started in a washing cycle, a second NTU is sensed based on the primary NTU, and a washing time, an amount of washing agent, and/or a number of times of rinsing are varied based on a difference value between the primary NTU and the secondary NTU, thereby improving washing performance and washing efficiency.

20 Claims, 6 Drawing Sheets

(56) References Cited

FOREIGN PATENT DOCUMENTS

| JP | H 0420391 | 1/1992 |
| KR | 10-1991-0014449 | 5/1994 |
| KR | 10-2009-0079707 | 7/2009 |
| WO | WO 2015/073165 | 5/2015 |

OTHER PUBLICATIONS

Chinese Office Action dated Feb. 2, 2019 issued in Application No. 201710398774.8.

* cited by examiner

CONTROL METHOD OF WASHING MACHINE

CROSS-REFERENCE TO RELATED APPLICATION

The present application claims the benefits of priority to Korean Patent Application No. 10-2016-0066791 filed on May 30, 2016, which is herein incorporated by reference in its entirety.

BACKGROUND

The present disclosure relates to a control method of a washing machine.

Recently, there has been employed a method in which the number of times of rinsing or the time for rinsing is properly adjusted by sensing a nephelometric turbidity unit (NTU) of washing water in a rinsing cycle, so that the rinsing efficiency of laundry is improved.

However, in the case of such a typical washing machine, a control method of setting a washing condition by sensing an NTU of washing water has not yet been applied to the washing machine. Accordingly, a washing cycle is performed according to a washing condition selected in a process of sensing an amount of laundry after the laundry is put into the washing machine.

Therefore, in a state in which a pollution level of laundry is not accurately sensed, an amount of washing agent, an amount of washing water, and a number of times of rinsing, corresponding to a preset pollution level, are selected, and a washing cycle is performed. Hence, the laundry is not appropriately washed.

For example, although the pollution level of laundry is low, an excessive amount of washing agent and an excessive amount of washing water are put into the washing machine, and a rinsing cycle is performed an excessive number of times. Therefore, waste of washing agent and washing water may be caused, and a delay of washing time may also be caused.

On the contrary, although the pollution level of laundry is high, a remarkably small amount of washing agent and a remarkably small amount of washing water are put into the washing machine. Therefore, the laundry may be appropriately washed.

Such problems are not solved using only the method in which the number of times of rinsing or the time for rinsing is properly adjusted by sensing an NTU of washing water in a rinsing cycle.

SUMMARY

Embodiments provide a control method of a washing machine, in which a primary nephelometric turbidity unit (NTU) of washing water is sensed before a washing course is started in a washing cycle, a second NTU is sensed based on the primary NTU, and a washing time, an amount of washing agent, and/or a number of times of rinsing are varied based on a difference value between the primary NTU and the secondary NTU, thereby improving washing performance and washing efficiency.

In one embodiment, a control method of a washing machine includes: sensing an amount of laundry; determining a primary washing condition including a washing time, an input amount of washing agent, and a number of times of rinsing, corresponding to the sensed amount of laundry; automatically putting a washing agent corresponding to the input amount determined based on the primary washing condition, and performing water supply; after the water supply is completed, performing a primary laundry wetting process during a first set time (T1); after the primary laundry wetting process is performed, sensing a primary NTU; and after the primary NTU is sensed, performing a secondary laundry wetting process and sensing a secondary NTU, wherein a washing condition is readjusted as a secondary washing condition, based on a difference value (Ns) between the secondary NTU and the primary NTU, and a washing operation is performed based on the readjusted washing condition, wherein the input amount of washing agent, determined in the determining of the primary washing condition, is an input amount of washing agent, corresponding to a first pollution level.

In the control method according to the present disclosure, a pollution level of laundry is more accurately determined, so that a washing time, an amount of washing agent, and a number of times of rinsing can be optimally determined. Further, an accurate washing condition is selected, so that the consumption of washing agent and washing water can be reduced. Furthermore, the washing time is reduced, so that power consumption can be minimized.

In detail, in the control method according to the present disclosure, the washing condition is readjusted suitable for an actual pollution level of laundry by sensing an NTU of washing water plural times before the washing course included in the washing cycle is started, so that the laundry is washed under an optimum condition.

For example, it is possible to prevent in advance a phenomenon that, as a pollution level of laundry is erroneously predicted, an excessive amount of washing agent and an excessive amount of washing water are put as compared with the pollution level, and therefore, the washing agent and the washing water are excessively consumed. Further, it is possible to prevent a phenomenon that a washing time is delayed as an excessive number of times of rinsing is set.

In addition, it is possible to prevent in advance a phenomenon that, as a pollution level of laundry is erroneously predicted, a remarkably small amount of washing agent and a remarkably small amount of washing water are put as compared with the pollution level, and therefore, the laundry is not properly washed. Further, it is possible to prevent a phenomenon that, as a number of times of rinsing is erroneously set, washing is ended in a state in which pollutants are not completely separated from laundry.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE EMBODIMENTS

Hereinafter, a control method of a washing machine according to an embodiment of the present disclosure will be described in detail with reference to the accompanying drawings.

Figure 1:
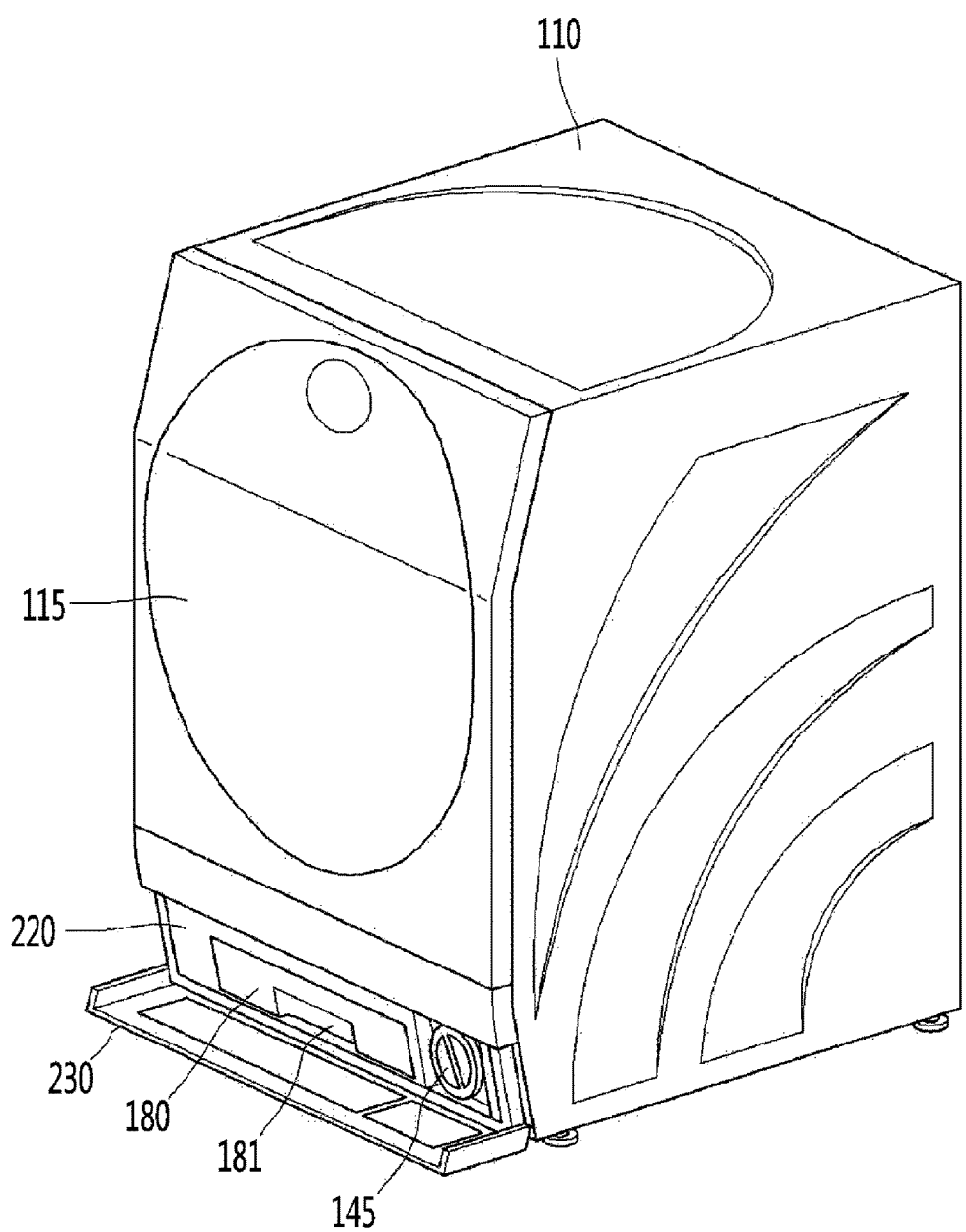
FIG. 1 is a perspective view illustrating an appearance of a washing machine to which a control method according to an embodiment of the present disclosure is applied.
Figure 2:
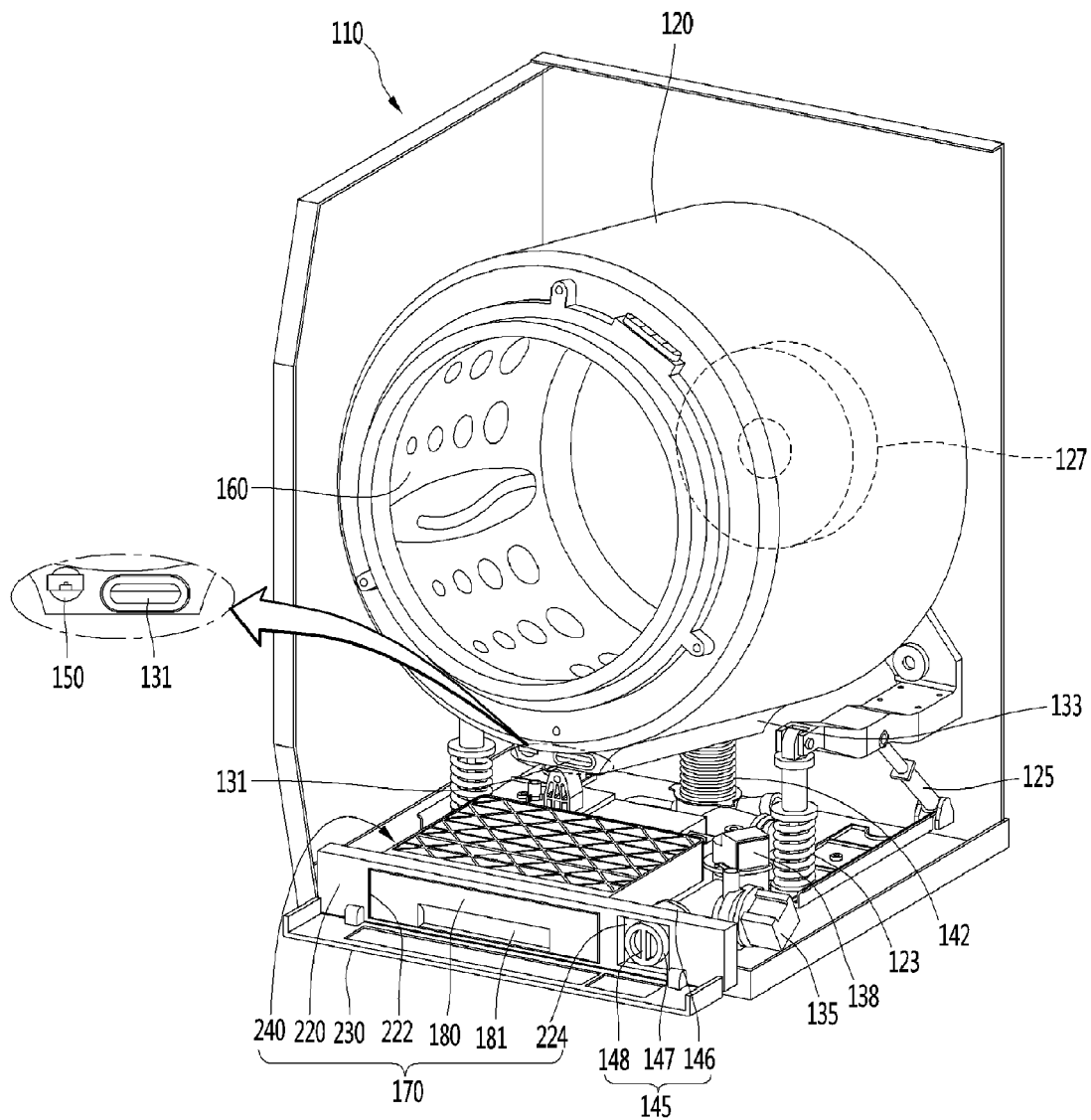
FIG. 2 is a perspective view illustrating an internal configuration of the washing machine.
Figure 3:
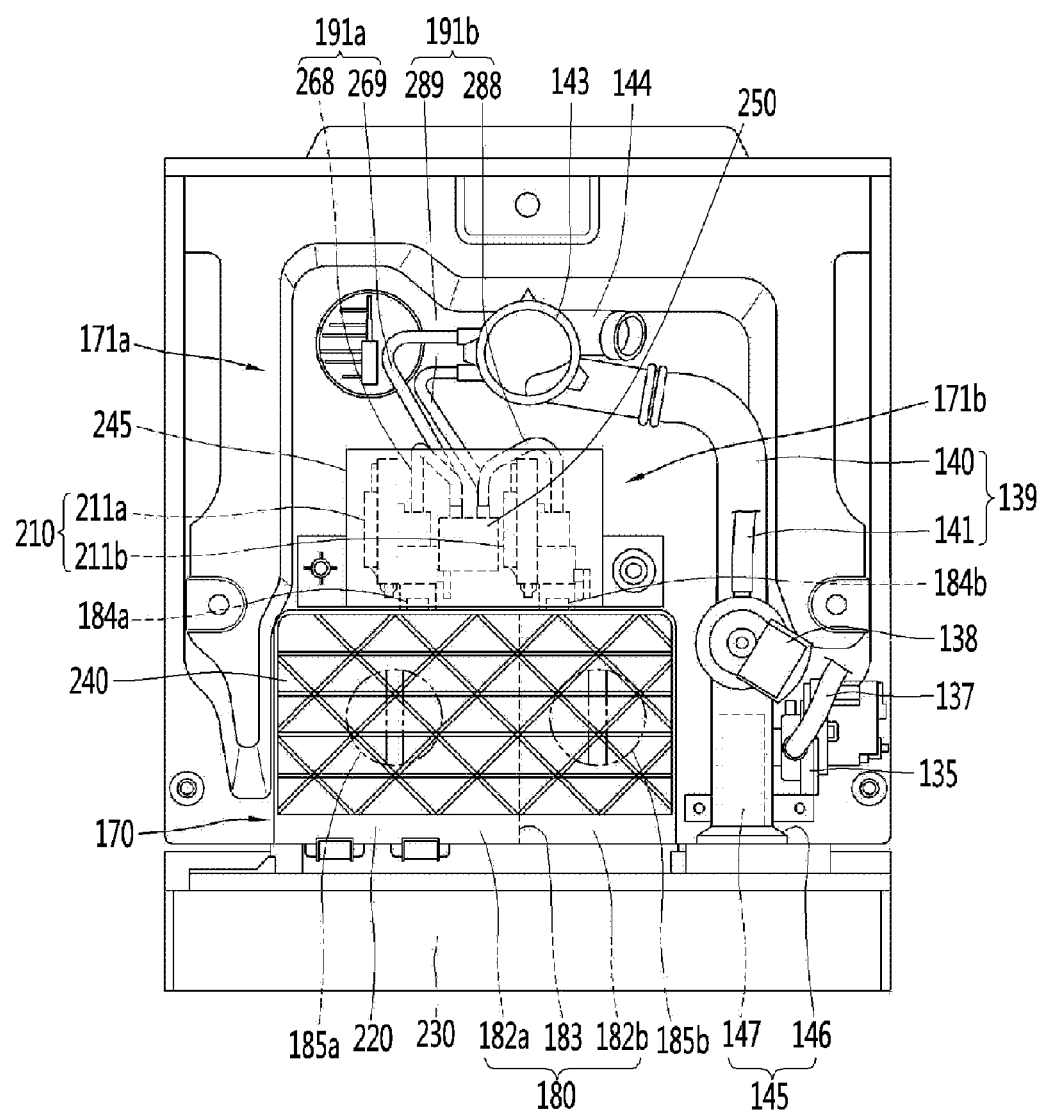
FIG. 3 is a plan view illustrating an internal bottom of the washing machine.
Figure 4:
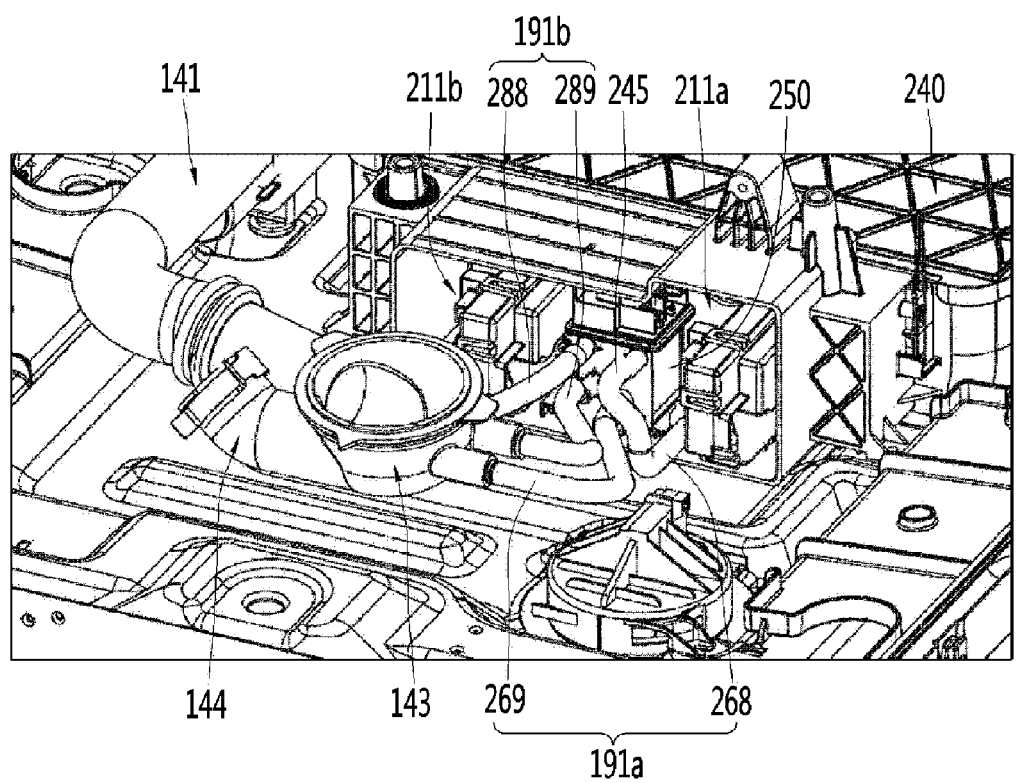
FIG. 4 is an enlarged perspective view illustrating the internal bottom of the washing machine, which is viewed from a rear side.

FIG. 1 is a perspective view illustrating an appearance of a washing machine to which a control method according to an embodiment of the present disclosure is applied. FIG. 2 is a perspective view illustrating an internal configuration of the washing machine. FIG. 3 is a plan view illustrating an internal bottom of the washing machine. FIG. 4 is an enlarged perspective view illustrating the internal bottom of the washing machine, which is viewed from a rear side.

Referring to FIGS. 1 to 4, the washing machine to which the control method according to the embodiment of the present disclosure is applied may include: a cabinet 110; a tub 120 provided in the cabinet 110; a drum 160 rotatably accommodated in the tub 120; a washing agent supply unit 170 including a storage container 180 accommodating a liquid washing agent including a liquid detergent or a liquid softener, the storage container 180 being extractable to the outside of the cabinet 110, a washing agent supply flow path 190 formed between the storage container 180 and the tub 120, and a pump 210 provided on the washing agent supply flow path 190 to supply the liquid washing agent to the tub 120; and a residual amount sensing unit 250 provided on the washing agent supply flow path 190 to sense a residual amount of the liquid washing agent.

In detail, the cabinet 110 may be formed in an approximately rectangular parallelepiped shape, and the tub 120 may be provided in the cabinet 110. The tub 120 may be formed in a cylindrical shape having an opened front surface. The tub 120 may be supported by a plurality of elastic members 123 and/or a plurality of dampers 125 such that vibration of the tub 120 can be suppressed.

A water collecting part 133 that stores washing water therein may be formed at a bottom portion of the tub 120. The water collecting part 133 forms a recessed part that protrudes to a lower side from a circumferential surface of the tub 120 formed in the cylindrical shape and extends in the length direction of the tub 120, to allow washing water to be collected therein. In addition, an electric heater 131 may be disposed in the water collecting part 133, heat the washing water collected in the water collecting part 133.

One or a plurality of turbidity sensors 150 may be mounted at one side of the water collecting part 133, to sense a pollution level of washing water.

The drum 160 may be accommodated in the tub 120.

Like the tub 120, the drum 160 may be formed in a cylindrical shape having an opened front surface. A driving motor 127 that rotates the drum 160 may be provided at a rear surface of the drum 160 or a rear surface of the tub 120. Openings of the tub 120 and the drum 160 may be disposed to face a front surface of the cabinet 110.

A door 115 that selectively opens/closes the openings formed at the front surfaces of the tub 120 and the drum 160 may be provided at the front surface of the cabinet 110. Laundry may be put into the drum 160 by opening the door 115.

A drainage pump 135 for draining water of the tub 120 and a circulating pump 138 for circulating washing water such that the washing water discharged from the tub 120 is again introduced into an upper region of the tub 120 may be provided at a lower side of the tub 120, i.e., the bottom of the cabinet 110.

A filter unit 145 that collecting foreign substances of water extracted from the tub 120. The filter unit 145 may include a filter casing 146, a filter 147 extractably inserted and coupled to the filter casing 146, and a handle provided at a front surface of the filter 147.

The filter casing 146 may be connected to a circulation pipe 140 that defines one region of a circulation flow path 139. The circulation flow path 139 may include the circulation pipe 140, a discharge pipe 141 connected to a discharge side of the circulating pump 138, a bellows 142, and a bellows connection part 143. The bellows connection part may be formed in, for example, a hemispherical shape having an opened upper side. A water level sensing pipe 144 that communicates with the tub 120 to sense a water level of the tub 120 may be connected to one side of the bellows connection part 143.

The discharge pipe 141 may be connected to the discharge side of the circulating pump 138, and one end portion of the discharge pipe 141 may be connected to an upper region of the tub 120. A drainage pipe 137 is connected to a discharge side of the drainage pump 135, to allow washing water passing through the filter unit 145 to be discharged to the outside of the washing machine.

Meanwhile, the washing agent supply unit 170 that supplies a washing agent to the tub 120 may be provided in the cabinet 110. In detail, the washing agent supply unit 170 may be provided, for example, at a lower side of the tub 120, i.e., the bottom of the cabinet 110.

The washing agent may include a liquid fabric detergent and a liquid fabric softener, and be defined as a material that can improve the washing effect of laundry.

The washing agent supply unit 170 may include the storage container 180, the washing agent supply flow path 190, and the pump 210.

The storage container 180 accommodates a liquid washing agent including a liquid detergent or a liquid softener, and is extractable to the outside of the cabinet 110. The washing agent supply flow path 190 may be formed between the storage container 180 and the tub 120. The pump 120 may be provided on the washing agent supply flow path 190.

The washing agent supply unit 17 may further include a frame 220 in which an extraction opening 222 for extracting the storage container 180 is formed, a cover 230 rotatably coupled to a front surface of the frame 220, and a storage container accommodating part 240 extending from a rear surface of the frame 220, the storage container accommodating part 240 accommodating the storage container 180 therein.

The frame 220 may be provided in a lower region of the front surface of the cabinet 110, and the cover 230 may be rotatably provided with respect to a horizontal axis passing through left and right edges of a lower end of the frame 220.

A filter opening 224 for access of the filter 147 may be formed at any point of the frame 220, which is spaced apart from the extraction opening 222 in a lateral direction. The cover 230 may simultaneously shield the extraction opening 222 and the filter opening 224 by being vertically rotated.

An internal space of the storage container 180 may be divided to separately accommodate a liquid fabric detergent and a liquid fabric softener. A handle 181 may be provided at a front surface of the storage container 180.

In detail, the storage container 180 may include a detergent accommodating part 182a that accommodates the liquid fabric detergent therein, a softener accommodating part 182b that accommodates the liquid fabric softener therein, and a dividing wall 183 that divides between the detergent accommodating part 182a and the softener accommodating part 182b.

The detergent accommodating part 182a and the softener accommodating part 182b may be configured to store different capacities according to kinds and amounts of detergent and softener used. In this embodiment, a case where the detergent accommodating part 182a is formed larger than the softener accommodating part 182b is illustrated, but sizes of the detergent accommodating part 182a and the softener accommodating part 182b may be appropriately adjusted.

A detergent injection hole may be formed at one side of an upper surface of the detergent accommodating part 182a. The detergent injection hole may be opened/closed by a detergent injection hole stopper 185a. A softener injection hole may be formed at the other side of the upper surface of the detergent accommodating part 182a. The softener injection hole may be opened/closed by a softener injection hole stopper 185b.

Meanwhile, the pump 210 that supplies a liquid washing agent may be disposed at the rear of the storage container accommodating part 240. The pump 210 may include a detergent pump 211a that supplies the liquid detergent and a softener pump 211b that supplies the liquid softener. The detergent pump 211a may be installed to communicate with the detergent accommodating part 182a, and the softener pump 211b may be installed to communicate with the softener accommodating part 182b.

A detergent pump connection part 184a and a softener pump connection part 184b, which are connected to the detergent pump 211a and the softener pump 211b to communicate with the detergent pump 211a and the softener pump 211b, may be provided in rear regions of the storage container 180, respectively.

Here, when the storage container 180 is received, the detergent pump connection part 184a and the softener pump connection part 184b may be configured such that the detergent accommodating part 182a and the softener accommodating part 182b are connected to the detergent pump 211a and the softener pump 211b to communicate with the detergent pump 211a and the softener pump 211b, respectively. When the storage container 180 is extracted, the detergent pump connection part 184a and the softener pump connection part 184b may be configured to block detergent from the detergent accommodating part 182a and leakage of softener from the softener accommodating part 182b, respectively.

An installation space part 245 of the detergent pump 211a and the softener pump 211b may be provided at one side (the rear on the drawing) of the storage container accommodating part 240. The installation space part 245 may be formed in a rectangular parallelepiped shape that is opened to the rear. The installation space part 245 may be configured such that the detergent pump 211a and the softener pump 211b are simultaneously accommodated therein.

Meanwhile, the washing agent supply flow path 190 for supplying the liquid washing agent to the tub 120 may be provided in a rear region of storage container accommodating part 240.

The washing agent supply flow path 190 may include a detergent supply flow path 191a for supplying the detergent and a softener supply flow path 191b for supplying the softener. The residual amount sensing unit 250 that senses a residual amount of the liquid washing agent may be provided on the washing agent supply flow path 190. As described above, the residual amount sensing unit 250 is installed separately from the storage container 180, so that the storage container 180 can be easily moved. In addition, the residual amount sensing unit 250 may be disposed between the detergent pump 211a and the softener pump 211b.

Figure 5:
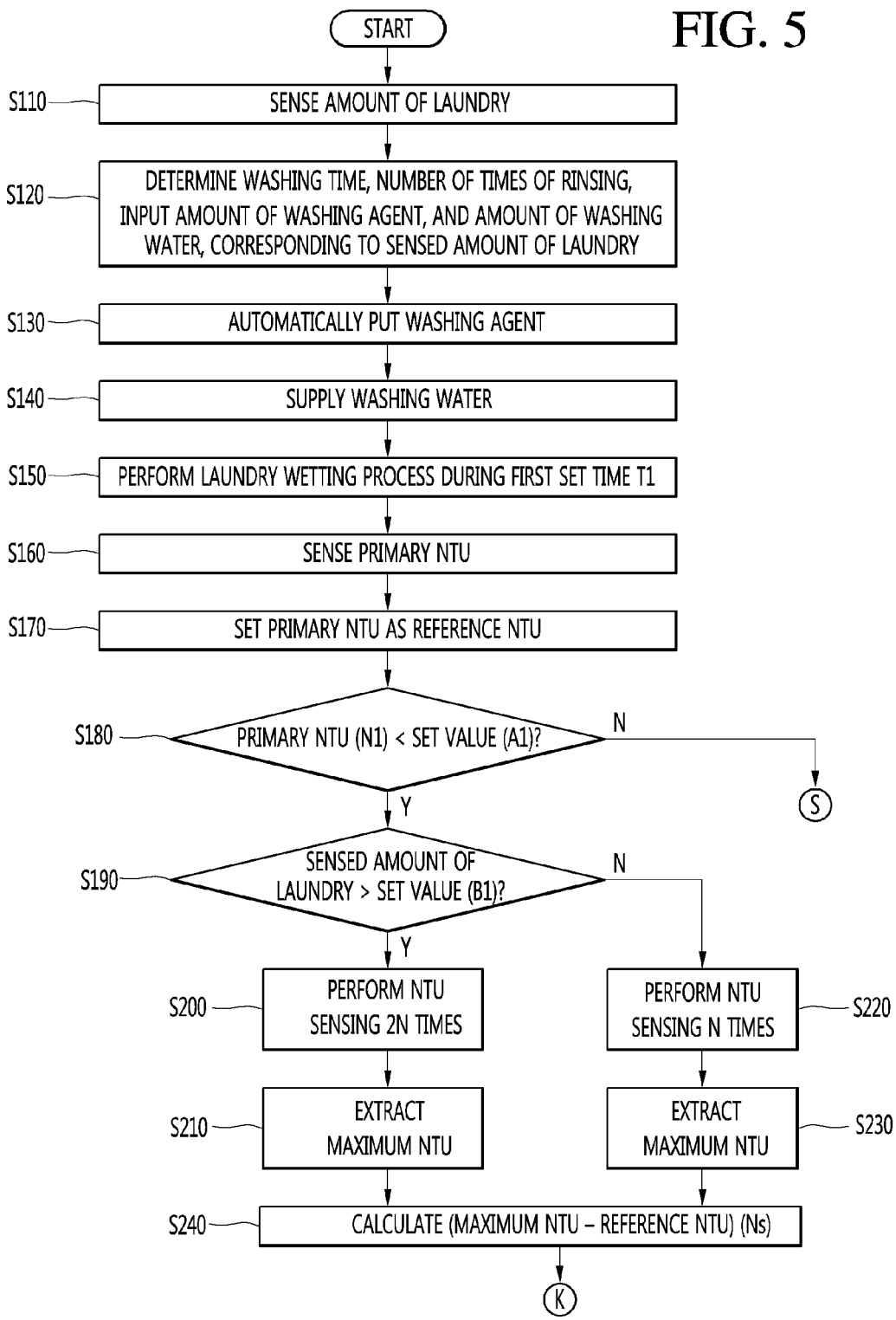
FIGS. 5 and 6 are flowcharts illustrating the control method of the washing machine by sensing a nephelometric turbidity unit (NTU) of washing water.
Figure 6:
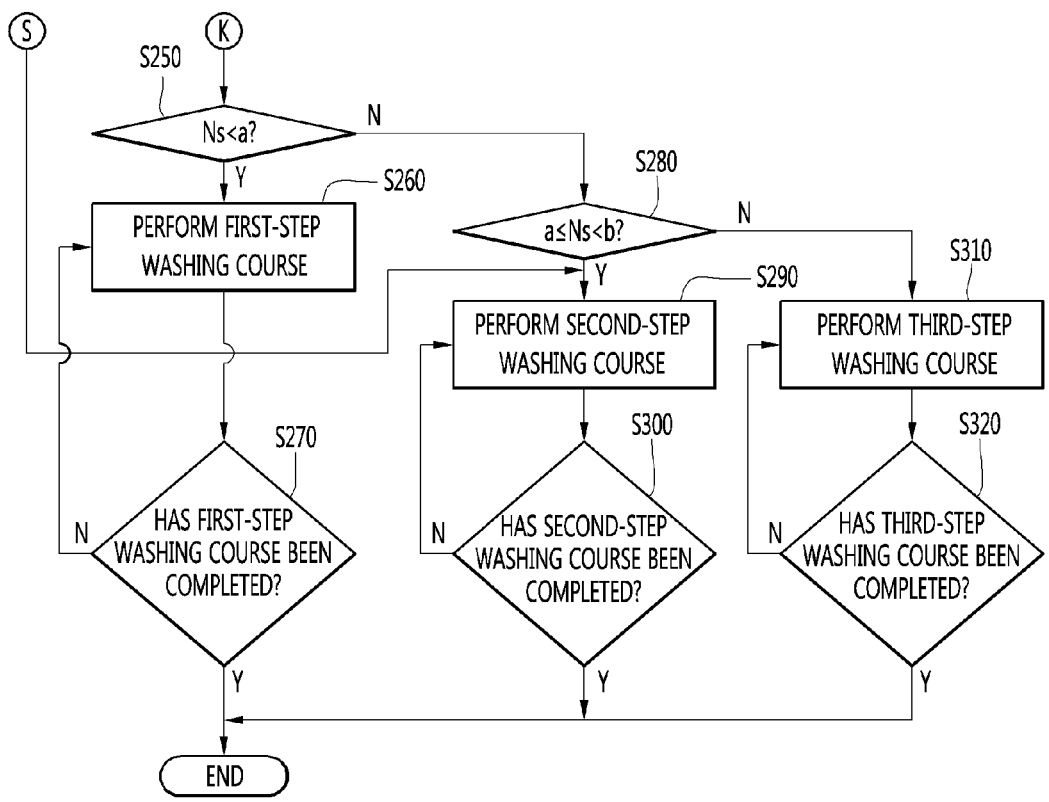

FIGS. 5 and 6 are flowcharts illustrating the control method of the washing machine by sensing a nephelometric turbidity unit (NTU) of washing water.

In the control method according to the embodiment of the present disclosure, which is disclosed in FIGS. 5 and 6, a primary NTU of washing water is sensed before a washing operation is started in a washing cycle, a secondary NTU is sensed based on the primary NTU, and a washing time, an amount of detergent, and/or a number of times of rinsing are varied based on a difference value between the primary NTU and the secondary NTU, thereby improving washing performance and washing efficiency.

First, referring to FIG. 5, if a washing course and an option are selected, and a start command is input, the driving motor 127 that drives the drum 160 is rotated clockwise/counterclockwise to sense an amount of laundry put into the drum 160 (S110). In addition, if an amount of laundry is sensed, a washing time, a number of times of rinsing, an input amount of washing agent, and an amount of washing water, corresponding to the sensed amount of laundry, are determined by a controller (not shown) (S120).

In addition, a washing agent is automatically put into the drum 160 from the washing agent supply unit 170 (S130), and washing water is supplied (S140). Here, the washing agent automatically put into the drum 160 may be put based on light soil. In detail, the amount of washing agent put into the drum 160 may be determined according to an amount of laundry and a pollution level of laundry, and the pollution level may be divided into light soil, normal soil, and heavy soil. In addition, the controller cannot accurately measure a pollution level of laundry in a process of putting a washing agent into the drum 160, and hence the amount of washing agent is determined based on when assuming that the pollution level of laundry is light soil. If the amount of washing agent is determined based on when assuming that the pollution level of laundry is normal soil or heavy soil, the washing agent cannot be again collected when an actual pollution level is weaker than the normal soil or the heavy soil. Thus, in order to prevent the washing agent from being excessively consumed, a minimum amount of washing agent is first put into the drum, and the washing agent is additionally put into the drum 160 in a subsequent process, based on an actual pollution level. That is, the amount of washing agent is determined based on 'light soil,' so that there occurs no situation in which the washing agent is to be again collected based on an actual pollution level.

In addition, the washing time and the number of times of rinsing may be determined based on 'normal soil.' This is because the washing time and the number of times of rinsing may be increased/decreased based on an actual pollution level. Hence, the washing time and the number of times of rinsing are determined based on an intermediate pollution level within the entire range of pollution levels.

In addition, as the washing time and the number of times of rinsing are finally increased/decreased based on 'normal soil,' the range of fluctuation of the washing time and the number of times of rinsing can be relatively small, as compared with when the washing time and the number of times of rinsing are finally increased based on 'light soil.' In addition, the range of fluctuation of an amount of washing agent, a washing time, and a number of times of rinsing, which are displayed on a display unit, is formed relatively small, so that the emotional impact felt by a user can be minimized.

For example, when a washing time and a number of times of rinsing are initially determined based on 'light soil,' and the pollution level of laundry is determined as 'heavy soil' in a subsequent process, the range of fluctuation of the washing time and the number of times of rinsing may be relatively large, as compared with when the washing time and the number of times of rinsing are initially determined based on 'normal pollution.' However, if the washing time and the number of times of rinsing are initially determined based on 'normal pollution,' the washing time and the number of times of rinsing, which are to be increased, are relatively small even when the pollution of laundry is determined as 'heavy soil' in a subsequent process. Hence, the user highly evaluates the reliability of an initial determination value, so that the emotional impact can be relatively reduced.

However, the present disclosure is not limited thereto, the washing time and the number of times of rinsing, which are automatically set after an amount of laundry is sensed, may be determined as 'light soil.'

Meanwhile, if the supply of washing water is completed, a laundry wetting process is performed during a first set time T1 (S150). The first set time T1 may be 60 seconds. In the laundry wetting process performed for the first set time T1, the driving motor 127 may be lightly rotated during the set time. For example, the drum 160 may be rotated in one direction at a rotation speed of 46 rpm during the first set time T1. Here, an operation of the drum 160 that is rotated in one direction at the rotation speed of 46 rpm may be defined as a tumble motion.

If the first set time T1 is elapses, the operation of the driving motor 127 is stopped, and a primary NTU (N1) is sensed (S160). In detail, the laundry wetting process may be performed during the first set time T1, the driving motor 127 may maintain a stop state during a set time before a secondary laundry wetting process is performed, and the primary NTU may be sensed at any point of time in the time when the driving motor 127 is stopped.

As an example, the driving motor 127 may be maintained in the stop state for about 60 seconds before the secondary laundry wetting process is performed, and an NTU of washing water may be sensed by the turbidity sensor 150 for three seconds in a latter half section in which 40 seconds elapses after the driving motor 127 is stopped.

In more detail, the turbidity sensor 150 may perform NTU sensing 30 times for the three seconds and transmit the sensed values to the controller, and the controller may determine, as the primary NTU, an average value of six values obtained by abandoning 12 upper values and 12 lower values among the sensed values transmitted thereto. An NTU calculation method is not limited to the above-described method, and various methods may be proposed.

In addition, if the primary NTU is calculated, the primary NTU is set as a reference NTU (S170).

In addition, the controller determines whether the primary NTU (N1) is equal to or greater than a set value A1 (S180). The set value A1 may be defined as a reference value for determining whether a secondary laundry wetting and NTU sensing process is to be performed.

In detail, the set value A1 may be determined by considering an NTU in a state in which the turbidity sensor 150 is not sunk in water but exposed to air, an NTU of clear water, and a detergent concentration based on light soil.

In more detail, if it is determined that the primary NTU N1 is equal to or greater than the set value A1, the secondary laundry wetting and NTU sensing process is omitted, and the control method proceeds to a step (S) in which a washing operation is performed under a washing condition set based on an amount of laundry, sensed by the driving motor 127.

On the other hand, if the primary NTU N1 is less than the set value A1, the secondary laundry wetting and NTU sensing process is performed.

In detail, before a form of the secondary laundry wetting and NTU sensing process is determined, it is determined whether the amount of laundry, sensed by the driving motor 127, exceeds a set value B1 (S190). The set value B1 may be defined a frequency (hz) of the driving motor, which corresponds to that the amount of laundry is a small or medium amount.

If it is determined that the sensed amount of laundry is equal to or smaller than the set value B1, i.e., that the amount of laundry is a small or medium amount, the secondary laundry wetting and NTU sensing process is performed n times (S220), and a maximum NTU is extracted from n NTUs extracted as a result (S230).

On the other hand, when the sensed amount of laundry exceeds the set value B1, i.e., when the amount of laundry is a massive amount, the secondary laundry wetting and NTU sensing process is performed 2n times (S200), and a maximum NTU is extracted from 2n NTUs extracted as a result (S210). Here, n may be 2.

In the secondary laundry wetting process, for each time, the driving motor may be rotated for 5 minutes and be stopped for 1 minute, and an NTU sensing process may be performed for the time when the driving motor is stopped. In addition, an NTU sensing method in the secondary NTU sensing process may be identical to that in the primary NTU sensing process.

In addition, during 5 minutes for which the driving motor 127 is driven, the tumble motion may be performed three times, and an alpha motion may be performed once. In the alpha motion, the driving motor 127 is rotated at a rotation speed higher than that in the tumble motion. As an example, in the alpha motion, the driving motor 127 may be rotated at a rotation speed of 50 rpm to 60 rpm. In the secondary laundry wetting process, the alpha motion is performed such that pollutants stained on laundry are separated to be dissolved in washing water as the washing water is soaked into the laundry as fast as possible. Consequently, a degree of pollution of the laundry is more accurately determined, so that a washing time, an amount of washing agent, and a number of times of rinsing can be optimally determined. Further, an accurate washing condition is selected, so that the consumption of washing agent and washing water can be reduced. Furthermore, the washing time is reduced, so that power consumption can be minimized.

Meanwhile, the secondary laundry wetting process may be performed under another condition, based on an amount of laundry, which is initially sensed by the driving motor 127. In addition, the amount of laundry may be divided into a small amount, a medium amount, and a massive amount depending on frequencies of the driving motor 127. In addition, a number of times of the laundry wetting process and a number of times of an NTU sensing process corresponding thereto may be differently set based on the sensed amount of laundry. Here, the NTU sensing process is performed for every laundry wetting process. In addition, the NTU sensing process, as described above, may be performed 30 times for three seconds in a latter half section during 60 seconds for which the driving motor 127 is stopped, and the final NTU sensing value may be determined as an average value of six values obtained by abandoning 12 upper values and 12 lower values among the sensed values.

As an example, when it is determined that the amount of laundry is equal to or smaller than the set value B1, i.e., that the amount of laundry is a small or medium amount, the secondary laundry wetting process may be performed twice (S220), and a maximum NTU is extracted from two NTUs calculated in the secondary laundry wetting process performed twice (S230). That is, an NTU having the highest value out of the two NTUs may become a final secondary NTU.

On the other hand, when it is determined that the amount of laundry exceeds the set value B1, i.e., that the amount of laundry is a massive amount, the secondary laundry wetting process may be performed four times (S200), and a maximum NTU is extracted from four NTUs calculated in the secondary laundry wetting process performed four times (S210). That is, an NTU having the highest value among the four NTUs may become a final secondary NTU. Here, the maximum NTU means that the pollution level of laundry is maximized.

If a maximum NUT is determined, a difference value Ns between the maximum NTU and the primary NTU sensed in the primary laundry wetting process is calculated. In addition, a step (K) in which the washing condition determined in the laundry amount sensing process is maintained as it is or changed may be performed based on the difference value Ns.

Referring to FIG. 6, the washing course is readjusted based on a secondary laundry wetting and secondary NTU measurement result, and the readjusted washing course may be subdivided from a first-step washing course to a third-step washing course. However, the washing course may be subdivided into washing courses of four or more steps.

In detail, in the first-step washing course, no washing agent is additionally put, and a washing time and a number of times of rinsing are decreased as compared with an initial condition determined based on 'normal soil.'

In the second-step washing course, an amount of washing agent is increased from the amount of washing agent, corresponding to 'light soil,' to the amount of washing agent, corresponding to 'normal soil,' and a washing time and a number of times of rinsing are maintained as the initial washing time and the initial number of times of rinsing, corresponding to 'normal soil.'

In the third-step washing course, an amount of washing agent is adjusted as an amount larger than that of washing agent, set in the second-step washing course, i.e., an amount of washing agent, corresponding to 'heavy soil.' In addition, a washing time and a number of times of rinsing are increased as compared with the condition set in the second-step washing course. That is, the washing time and the number of times of rinsing are increased to those corresponding to 'heavy soil.'

Meanwhile, if the control method enters into the step (K) in which the washing condition is changed or readjusted, the difference value Ns is compared with a first set value a (S250). If it is determined that the difference value Ns is smaller than the first set value a, the first-step washing course is performed (S260).

In detail, that a difference between the primary NTU and the secondary NTU is smaller than the first set value a may mean that the pollution level of laundry is not greater than a predictive value. In other words, that the difference between the secondary NTU and the primary NTU is not great in a state in which the primary NTU has a value close to the NTU of clear water as the primary NTU is smaller than the set value A1 may mean that the pollution level of laundry is actually lower than a normal pollution level predicted by the controller.

Therefore, the washing time may be reduced as compared with the initial set time, and the number of times of rinsing may also be reduced as compared with the initial set number of times, without additionally putting the washing agent. As an example, in the first-step washing course, the washing time may be reduced by about 10 minutes as compared with the initial set time, and the number of times of rinsing may also be reduced to twice from the initial three times.

In addition, it is determined whether the difference value Ns is equal to or greater than the first set value a and less than a second set value b (b>a) (S280). If it is determined that the difference value Ns is a value between the first set value a and the second set value b, the second-step washing course is performed (S290).

That the difference value Ns corresponds to any value between the first set value a and the second set value b may mean that the pollution level of laundry corresponds to that of 'normal soil.' However, although the pollution level of laundry corresponds to that of 'normal soil,' it is initially set that a washing agent corresponding to 'light soil' is put, and hence a washing agent is additionally put to satisfy an amount of washing agent, corresponding to 'normal soil.'

In addition, as described above, when it is determined that the primary NTU is greater than the set value A1, the second-step washing course is immediately performed without performing the secondary laundry wetting process. When the primary NTU is calculated as a value greater than the set value A1, this may be caused by a water quality of washing water or an erroneous sensing of the turbidity sensor. In this case, the controller does not transmit an error signal or generate a washing stop signal, but may allow a washing course corresponding to 'normal soil' to be performed.

Meanwhile, if it is determined that the difference value Ns is equal to or greater than the second set value b, the third-step washing course is performed (S310).

In detail, that the difference value Ns is equal to or greater than the second set value b may mean that a large quantity of pollutants stained on laundry is separated in the secondary laundry wetting process, which may mean that the pollution level of laundry is more serious than that initially predicted by the controller. Therefore, a washing time, an input amount of washing agent, and a number of times of rinsing are all increased as compared with initial set values (or set values in the second-step washing course). That is, the washing time, the input amount of washing agent, and the number of times of rinsing are changed to those corresponding to 'heavy soil.'

Specifically, the amount of washing agent is changed from an initial set amount corresponding to 'light soil' to an amount of washing agent, corresponding to 'heavy soil,' to allow the washing agent to be additionally put.

In addition, the washing time may be increased by 20 minutes as compared with an initial set time corresponding to 'normal soil,' and the number of times of rinsing may be increased to four or five times from the initial three times corresponding to 'normal soil.'

The washing time, the input amount of washing agent, and the number of times of rinsing, which are set in each of the first-step washing course to the third-step washing course, are not limited to the embodiment described above, and may be set to appropriate values on the basis of experiments.

In addition, although the pollution level is divided into three steps in the above-described embodiment, the present disclosure is not limited thereto, and the pollution level may be subdivided into four or more steps.

In addition, if the first-step washing course to third-step washing course are all completed (S270, S300, and S320), the washing course is ended, and a rinsing cycle is started. The rinsing cycle may include a drainage process, a dehydration process, a water supply process, and a rinsing process.

According to the above-described control method, the washing condition is readjusted suitable for an actual pollution level of laundry by sensing an NTU of washing water plural times before the washing course included in the washing cycle is started, so that the laundry is washed under an optimum condition.

For example, it is possible to prevent in advance a phenomenon that, as a pollution level of laundry is erroneously predicted, an excessive amount of washing agent and an excessive amount of washing water are put as compared with the pollution level, and therefore, the washing agent and the washing water are excessively consumed. Further, it is possible to prevent a phenomenon that a washing time is delayed as an excessive number of times of rinsing is set.

In addition, it is possible to prevent in advance a phenomenon that, as a pollution level of laundry is erroneously predicted, a remarkably small amount of washing agent and a remarkably small amount of washing water are put as compared with the pollution level, and therefore, the laundry is not properly washed. Further, it is possible to prevent a phenomenon that, as a number of times of rinsing is erroneously set, washing is ended in a state in which pollutants are not completely separated from laundry.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A control method of a washing machine, comprising:
    sensing an amount of laundry;
    determining a first washing condition including a washing time, an input amount of washing agent, and a number of times of rinsing, corresponding to the sensed amount of laundry;
    automatically putting a washing agent corresponding to the input amount determined based on the first washing condition, and performing water supply;
    after the water supply is completed, performing a first laundry wetting process during a first set time (T1) by a driving motor rotating a drum of the washing machine;
    after the first laundry wetting process is performed, stopping the driving motor and sensing a first nephelometric turbidity unit (NTU) while the driving motor is stopped; and
    after the first NTU is sensed, performing a second laundry wetting process by the driving motor rotating the drum, subsequently stopping the driving motor, and sensing a second NTU while the driving motor is stopped,
    wherein the first washing condition is adjusted, based on a difference value (Ns) between the second NTU and the first NTU, and a washing operation is performed based on the adjusted washing condition in which the input amount of the washing agent is changed based on a first pollution level of the laundry.

2. The control method of claim 1, wherein, in the performing of the first laundry wetting process, the drum is rotated at a first rotation speed during the first set time (T1),
    when the first set time T1 elapses, the rotation of the drum is stopped during a second set time (T2), and
    the sensing of the first NTU is performed within the second set time (T2).

3. The control method of claim 2, wherein each of the first set time (T1) and the second set time (T2) is 60 seconds,
    the sensing of the first NTU is performed 30 times in 3 seconds within the second set time (T2), and
    an average value of six values obtained by abandoning 12 upper values and 12 lower values among calculated 30 NTUs is determined as the first NTU.

4. The control method of claim 2, wherein, when it is determined that the first NTU is less than a set value (A1), the sensed amount of laundry is compared with a set value (B1),
    when it is determined that the sensed amount of laundry is equal to or smaller than the set value (B1), the second laundry wetting process and the second NTU sensing are performed n number of times, wherein n is greater than 0, and
    when it is determined that the sensed amount of laundry exceeds the set value (B1), the second laundry wetting process and the second NTU sensing are performed 2 times n number of times.

5. The control method of claim 4, wherein each of the plurality of second laundry wetting processes includes:
    a first process of rotating the drum at a rotation speed greater than the first rotation speed during a third set time; and
    a second process of stopping the rotation of the drum during the second set time after the first process is ended,
    wherein a second NTU sensing is performed in the second process,
    wherein a third set time is longer than the first set time,
    wherein the second NTU sensing is identical to the first NTU sensing.

6. The control method of claim 5, wherein a maximum value among NTUs calculated by performing an NTU sensing the n or 2 times n number of times is finally selected as the second NTU,
wherein the difference value (Ns) is a difference value between the second NTU and the first NTU.

7. The control method of claim 1, wherein, when the difference value (Ns) is smaller than a first set value (a), the washing operation is to be performed based on a first washing course,
wherein, when the difference value (Ns) is equal to or greater than the first set value (a) and smaller than a second set value (b), the washing operation is to be performed based on a second washing course, and
wherein, when the difference value (Ns) is equal to or greater than the second set value (b), the washing operation is to be performed based on a third washing course.

8. The control method of claim 7, wherein, when it is determined that the first NTU is equal to or greater than the set value (A1), the washing operation is performed under the adjusted washing condition without the second laundry wetting process and the second NTU sensing.

9. The control method of claim 7, wherein, in the first washing course, no washing agent is additionally put.

10. The control method of claim 9, wherein, in the first washing course, a washing time and a number of times of rinsing are decreased as compared with those in the determining of the first washing condition.

11. The control method of claim 7, wherein, in the second washing course, a washing agent is additionally put.

12. The control method of claim 11, wherein, in the second washing course, a washing time and a number of times of rinsing are maintained as those in the determining of the first washing condition.

13. The control method of claim 7, wherein, in the third washing course, a washing agent is additionally put,
wherein an amount of the additionally put washing agent is greater than that of the washing agent additionally put in the second step second washing course.

14. The control method of claim 13, wherein, in the third washing course, a washing time and a number of times of rinsing are increased as compared with those in the second washing course.

15. The control method of claim 7, wherein, when the performance of any one of the first to third washing courses is completed, a rinsing cycle including a drainage operation is started.

16. The control method of claim 8, wherein the pollution level of the laundry is divided into light soil, normal soil having a pollution level higher than that of the light soil, and heavy soil having a pollution level higher than that of the normal soil,
wherein the first pollution level is a pollution level corresponding to that of the light soil.

17. The control method of claim 16, wherein the washing time and the number of times of rinsing, which are determined in the determining of the first washing condition, are a washing time and a number of times of rinsing, which correspond to the normal soil.

18. The control method of claim 16, wherein, in the first washing course, no washing agent is additionally put, the washing time is decreased by 10 minutes as compared with the first washing condition, and the number of times of rinsing is decreased by once,
wherein, in the second washing course, a washing agent is additionally put such that an amount of washing agent, corresponding to the normal soil, is supplied, and the washing time and the number of times of rinsing are maintained under the first washing condition, and
wherein, in the third washing course, a washing agent is additionally put such that an amount of washing agent, corresponding to the heavy soil, is supplied, the washing time is increased by 20 minutes as compared with that in the second washing course, and the number of times of rinsing is increased by once or twice as compared with that in the second washing course.

19. The control method of claim 6, wherein the n is 2.

20. The control method of claim 5, wherein the third set time is 5 minutes.

* * * * *